US010652311B2

(12) United States Patent
Kennedy et al.

(10) Patent No.: US 10,652,311 B2
(45) Date of Patent: *May 12, 2020

(54) COMPUTERIZED SYSTEM AND METHOD FOR DETERMINING AND COMMUNICATING MEDIA CONTENT TO A USER BASED ON A PHYSICAL LOCATION OF THE USER

(71) Applicant: OATH INC., New York, NY (US)

(72) Inventors: Lyndon Kennedy, San Francisco, CA (US); Vikas Kumar, Minneapolis, MN (US); Saeideh Bakhshi, San Francisco, CA (US); David Ayman Shamma, San Francisco, CA (US)

(73) Assignee: OATH INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,493

(22) Filed: Nov. 21, 2018

(65) Prior Publication Data
US 2019/0089770 A1 Mar. 21, 2019

Related U.S. Application Data

(63) Continuation of application No. 14/969,795, filed on Dec. 15, 2015, now Pat. No. 10,142,396.

(51) Int. Cl.
*H04L 29/08* (2006.01)
*G06F 16/951* (2019.01)
(Continued)

(52) U.S. Cl.
CPC ........ *H04L 67/06* (2013.01); *G06F 16/24578* (2019.01); *G06F 16/951* (2019.01);
(Continued)

(58) Field of Classification Search
CPC ............ H04L 65/4084; H04L 67/1002; H04N 21/2223; G06Q 50/01; G06Q 10/10; G06F 16/9535
(Continued)

(56) References Cited

U.S. PATENT DOCUMENTS 8,611,929 B1 * 12/2013 Vandehey ............... H04W 4/02
455/456.3
9,275,074 B1 * 3/2016 Patel .................... G06F 16/9537
(Continued)

*Primary Examiner* — Mahran Y Abu Roumi
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods automatically determine media content to communicate to a user based on the user's location. The disclosed systems and methods enable novel media content distribution to a user based on 1) the location of the user (i.e., physical location or geo-location), 2) other users' classified relationships to the location; and 3) user generated media content by the classified other users.

23 Claims, 6 Drawing Sheets

(51) Int. Cl.
*G06F 16/2457* (2019.01)
*H04W 4/02* (2018.01)
*H04W 4/21* (2018.01)

(52) U.S. Cl.
CPC ............ *H04L 67/18* (2013.01); *H04W 4/023* (2013.01); *H04W 4/21* (2018.02)

(58) Field of Classification Search
USPC ........................................................ 709/219
See application file for complete search history.

(56) References Cited

U.S. PATENT DOCUMENTS

| | | | | |
|---|---|---|---|---|
| 2007/0266395 | A1* | 11/2007 | Lee | H04H 60/31 725/11 |
| 2008/0249841 | A1* | 10/2008 | Ruark | G06Q 30/02 705/7.29 |
| 2009/0044235 | A1* | 2/2009 | Davidson | G06Q 30/06 725/87 |
| 2012/0166431 | A1* | 6/2012 | Brewington | G06F 16/9537 707/724 |
| 2012/0213404 | A1* | 8/2012 | Steiner | G06K 9/00677 382/103 |
| 2012/0221687 | A1* | 8/2012 | Hunter | G06F 16/435 709/219 |
| 2012/0320013 | A1* | 12/2012 | Perez | H04N 5/91 345/207 |
| 2013/0290430 | A1* | 10/2013 | Yung | H04L 67/22 709/204 |
| 2015/0294358 | A1* | 10/2015 | Galadari | G06Q 30/0257 705/14.55 |
| 2015/0304437 | A1* | 10/2015 | Vaccari | G06F 16/9537 709/204 |
| 2016/0019298 | A1* | 1/2016 | Brodie | G06F 16/9535 707/734 |
| 2016/0267493 | A1* | 9/2016 | Liu | G06Q 30/0185 |
| 2017/0031907 | A1* | 2/2017 | Juang | G06F 16/435 |
| 2017/0140285 | A1* | 5/2017 | Dotan-Cohen | G06N 5/048 |
| 2017/0161280 | A1* | 6/2017 | Almas | G06K 9/00677 |

\* cited by examiner

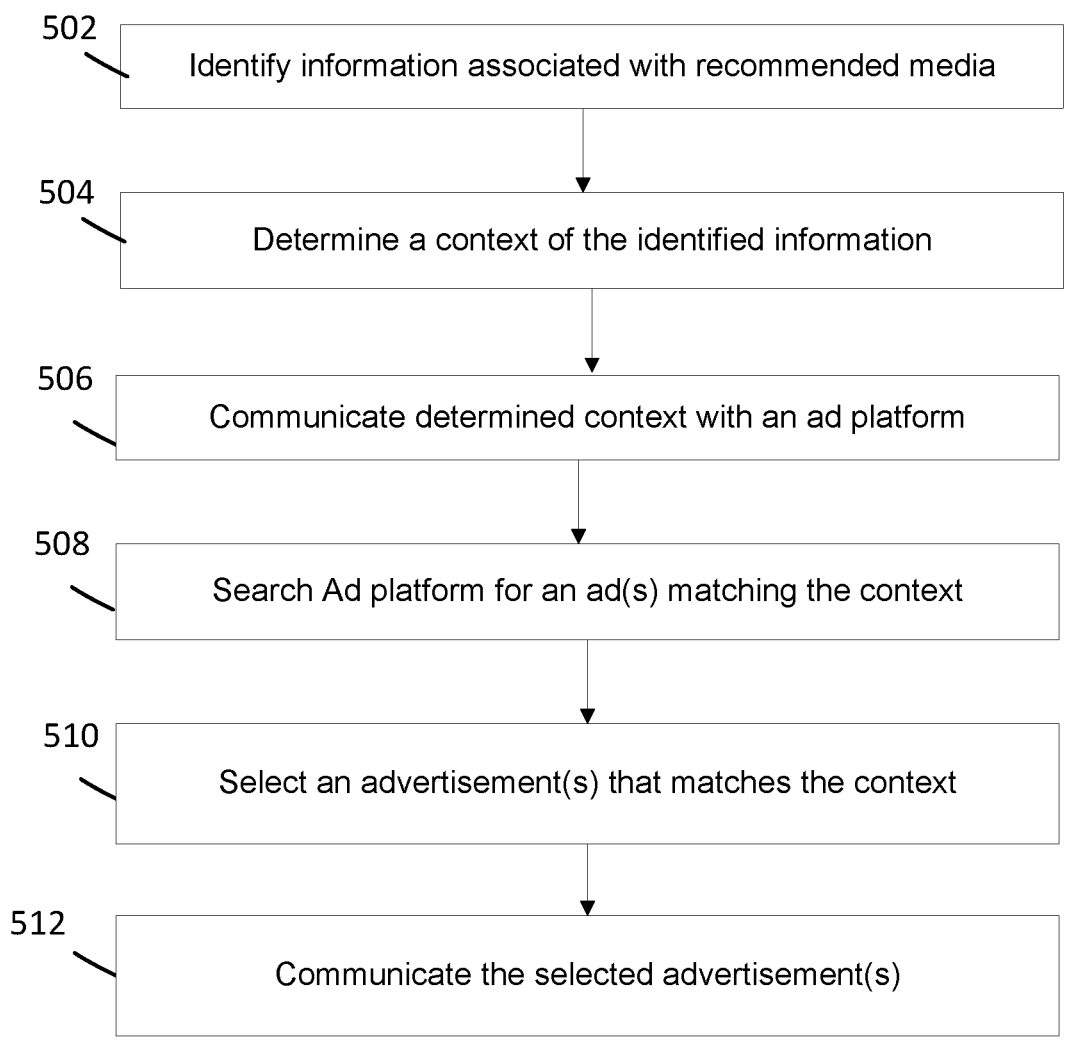

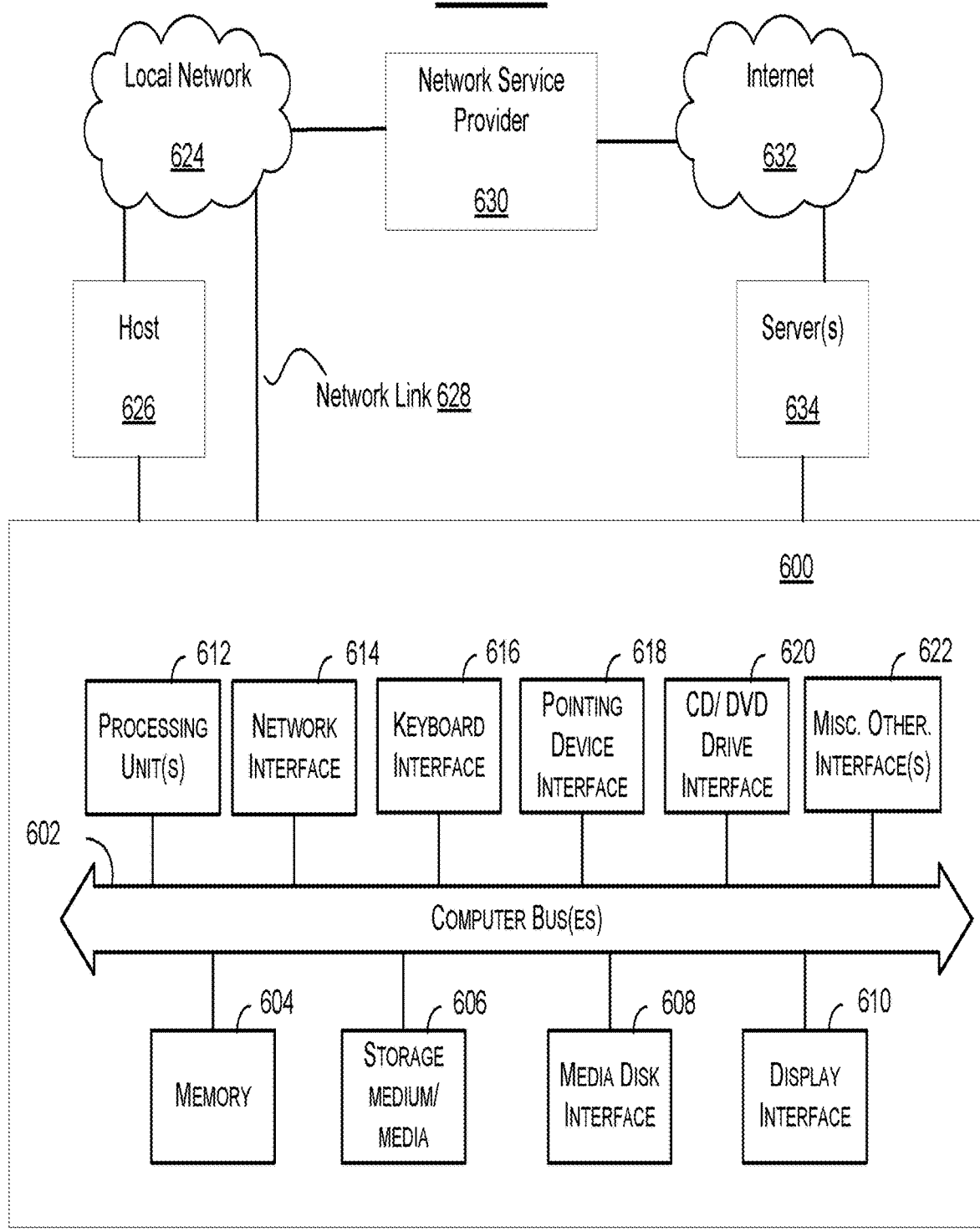

COMPUTERIZED SYSTEM AND METHOD FOR DETERMINING AND COMMUNICATING MEDIA CONTENT TO A USER BASED ON A PHYSICAL LOCATION OF THE USER

This patent application claims the benefit of and is a continuation of U.S. patent application Ser. No. 14/969,795, filed on Dec. 15, 2015, titled "Computerized System And Method For Determining And Communicating Media Content To A User Based On A Physical Location Of The User", which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing, recommending and/or hosting computer systems and/or platforms by modifying the capabilities and providing non-native functionality to such systems and/or platforms for automatically determining media content to communicate to a user based on the user's location.

SUMMARY

The present disclosure provides systems and methods for novel media content distribution to a user based on 1) the location of the user (i.e., physical location or geo-location), 2) other users' relationship to the location; and 3) user generated media content by those other users.

According to some embodiments of the present disclosure, the disclosed systems and methods enable the recommendation or distribution of media content to a new user despite the content providing system (e.g., Tumblr®, Flickr® and the like) not previously having access to any information about the user's particular interests, behaviors or identity. The disclosed systems and methods can, for example: (1) effectuate the discovery of new media content by users through the disclosed recommendation techniques; (2) improve the experience of new users (who face a "cold start" problem of having the system or platform not readily know their interests or behaviors); and (3) allow content curators the ability to reach previously unreachable users.

It will be recognized from the disclosure herein that embodiments of the instant disclosure provide improvements to a number of technology areas, for example those related to systems and processes that handle or process content recommendations, such as but not limited to, search engines, local and/or web-based applications, e-mail or other types of media rendering or recommendation platforms, electronic social networking platforms and the like. The disclosed systems and methods can effectuate increased speed and efficiency in novel ways users can access new media content, in addition to an increased contextual relevancy per user regarding the media they are receiving, thereby reducing user effort in discovering new media. Users will be provided a novel, personalized experience through the disclosed systems and methods leveraging information about a user's location and other user's interactions with media content when at such location, thereby enabling the user to avoid having to provide all, if any, aspects of desired/requested content. Additionally, the system or platform providing such content is not required to be apprised of any information about the user in advance of providing the media content to the user besides the user's current location.

In accordance with one or more embodiments, a method is disclosed which includes receiving, at a computing device over a network, a request for a media file to communicate to a device of a user; determining, via the computing device, a geographic location associated with the user; identifying, via the computing device, a first media file from a collection of media files associated with a media platform, the identifying comprising determining that the first media file is associated with the geographic location; identifying, via the computing device, a first user that uploaded the first media file to the media file platform; determining, via the computing device, a classification of the first user, the classification comprising determining the first user's activity on the media platform respective to the geographic location; compiling, via the computing device, a set of media files uploaded by the first user to the media platform based on the classification; determining, via the computing device, visual content information and social metric information for each media file in the set, the determination further comprising scoring each media file in the set based on the visual content information and social metric information; ranking, via the computing device, each media file in the set based on the determined score, wherein the media files in the set with higher scores are ranked higher than those with lower scores; and automatically communicating, via the computing device, at least one of the ranked media files to the user device.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically determining media content to communicate to a user based on the user's location.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 is a flowchart illustrating steps performed in accordance with some embodiments of the present disclosure; and FIG. 6 is a block diagram illustrating the architecture of an exemplary hardware device in accordance with one or more embodiments of the present disclosure.

DESCRIPTION OF EMBODIMENTS

Figure 1:
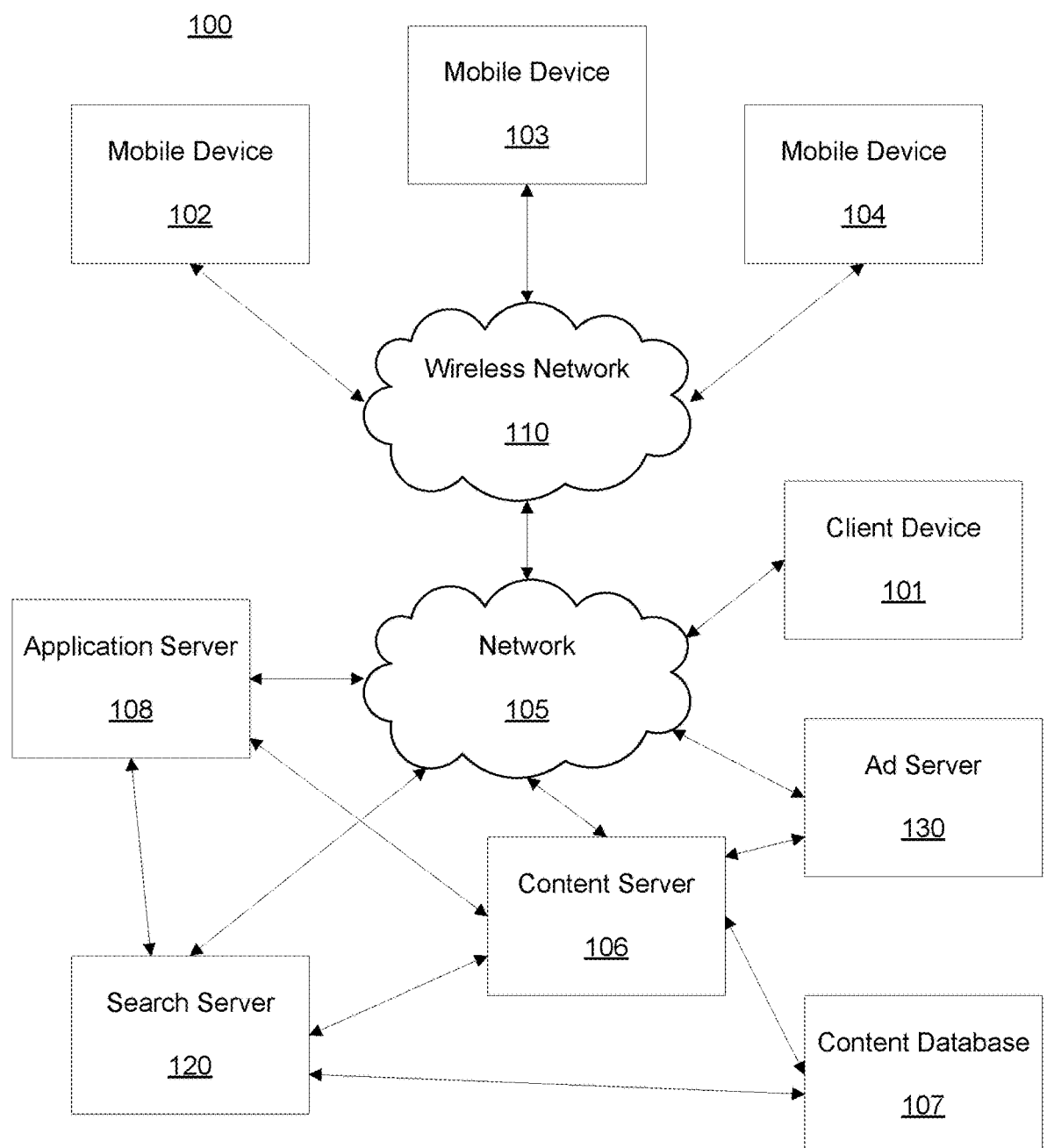
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

The principles described herein may be embodied in many different forms. By way of background, places in the same city, for example, can have very different associations and effects on human emotions and behavior—a concept founded in "psychogeography" that discusses the laws and methods for exploring an urban landscape or a city. The fact that locals and tourists have very different interests in a city implies that the locations they explore may be different compared to one another. Indeed, consumer psychology for tourism suggests that there are differences in tourist and local behaviors depending on what the city has to offer. For example, tourists in their short stay explore places for which the city is known. For example, in San Francisco, tourists are often seen exploring the ferry building, piers, or the Golden Gate bridge, whereas locals (or residents) can be found at lesser-known locations, such as coffee shops, local bars or restaurants, and the like.

Traditional or conventional recommendation systems fail to leverage the information that distinguishes locals from tourists. Existing systems simply group all users together based on their preferences or identity, and provide recommendations, whether location- or content-based, in accordance with a determined context of such users. For example, mobile applications such as Foursquare® and Google Now® simply utilize a user's location and their interests to provide content to a user.

The disclosed systems and methods address the shortcomings in existing technology by providing novel systems and methods that service the implicit preferences of users by utilizing the visual patterns of media content produced or interacted with by locals and/or tourists. Using the descriptors of media content associated with a location in determining patterns of particular content and/or content types, the disclosed systems and methods can leverage the derived preferences specific to locals and tourists in order to recommend media content to other users. The disclosed systems and methods solve the problem of finding locally-relevant content to recommend to users on social media sharing sites—for example, image content recommended or provided to a Flickr® user. This is particularly important for new users signing up to a service. As discussed herein, the disclosed systems and methods can recommend the highest quality and/or most viral or trending content on a site to the new user in order to give them a feel for what is available.

According to some embodiments of the instant disclosure, the disclosed systems and methods effectuate the distribution and/or recommendation of media content to a user despite the system or platform having no prior knowledge of the user's particular interests, behaviors, demographics, or identity, and the like—known by those of skill in the art as the "cold start" problem. In some embodiments, the disclosed systems and methods determine the location of a user—i.e., the current geographical or physical location of the user. As discussed in more detail below, in some embodiments, for example, this involves obtaining the user's global positioning system (GPS) data or Internet Protocol (IP) address from the user's mobile device and identifying the user's current location from such data. The disclosed systems and methods then analyze the activity of previous users on stored photographs (referred to as images interchangeably) associated with that location. For example, the systems and methods can analyze which images users previously at that same location viewed, uploaded, downloaded created, edited, captured, favorited or shared. The systems and methods then analyze the information associated with such users to determine whether those previous users were "locals" or "non-locals" (or "tourists, used interchangeably with "non-locals"). As discussed in more detail below, a user can be determined to be a "local" if they live at or around that location (within a predetermined distance) or were located at or around that location for a predetermined time (satisfying a time threshold).

In some embodiments, the disclosed systems and methods then analyze the content of images associated with the "locals" to determine visual topics that are unique to that location. According to some embodiments, as discussed in more detail below, this enables the determination of which topics, landmarks and/or activities are of interest to those users that live, reside or maintain a place to stay at the location for predetermined periods of time.

According to some embodiments of the present disclosure, a photo(s) is then recommended (or communicated) to the user. The communicated photo identified in accordance with the photo's relevance to a visual topic(s) that is unique to locals of the location. In some embodiments, as discussed below, the identification of a recommended photo can also be based on, or combined with the overall social activity received by a photograph (such as, but not limited to, favorites, shares, views, or comments).

In some alternative embodiments, as discussed below, the disclosed systems and methods can analyze the images associated with "tourists"; and in some embodiments, the analysis can be respective to images of both "locals" and "tourists", where the visual topics of the "locals" are weighted so that they are more influential in the recommendation process. For example, a score of an image created by a local may be subject to a multiplier, for example, a multiplier of 2. Therefore, if a score for an image associated with a tourist is scored at 5, the same image would be scored at 10 if it were created by a local. Thus, for example, image X is created by a tourist and is scored at 4 and image Y is created by a local and is scored at 3; however, due to the multiplier (or weighting factor for locals), the local's image score would be 6, thereby having a greater influence than the lower scored tourist's image within the recommendation process, as discussed in more detail below.

As evidenced from the discussion herein, by engaging users with appropriate and geographically relevant, high-quality or trending content early on (e.g., upon joining a network), the instant disclosure's discussed mechanisms for content discovery can assist in boosting users' retention within the social landscape of the Internet. New users to a network (e.g., a new user to Flickr® or Tumblr®) can immediately be provided with contextually relevant content based on their location without the network provider or platform having any previously elicited or granted access to information about the user. This enables the user to easily view topical information and access the benefits of the systems/platform immediately, without the system first having to learn his/her preferences or interests.

For purposes of the present disclosure, the type of media to be discussed will be in reference to images or photographs; however, it should not be construed to limit the applications of the systems and methods discussed herein. While reference is made throughout the instant disclosure to images (e.g., photos/images uploaded, downloaded, shared and the like, on photo-sharing sites or social networks), any other forms of user generated content and associated information, including, for example text, audio, multimedia, video, graphics interchange format (GIF) files, RSS feed information, can be used without departing from the scope of the instant application.

According to some embodiments, the disclosed systems and methods can determine all of the recommendations offline in a batch process (with periodic updates to include newer images) and then automatically serve the recommendations to new users upon them joining a social network. In certain embodiments, the off-line batch process can involve coordinate queries being sent to the user's device upon them joining the social network (or logging into the network) in order to determine the user's current latitude and longitude coordinates.

As discussed in more detail below at least in relation to FIG. 5, according to some embodiments, information associated with or derived from recommended media, selected and/or rendered media, as well as the user's location, as discussed herein, can be used for monetization purposes and targeted advertising when providing, delivering or enabling access to the recommended/selected media. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as a photo sharing site/service (e.g., Tumblr®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a photo/image application and/or photo-platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a photo sharing application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
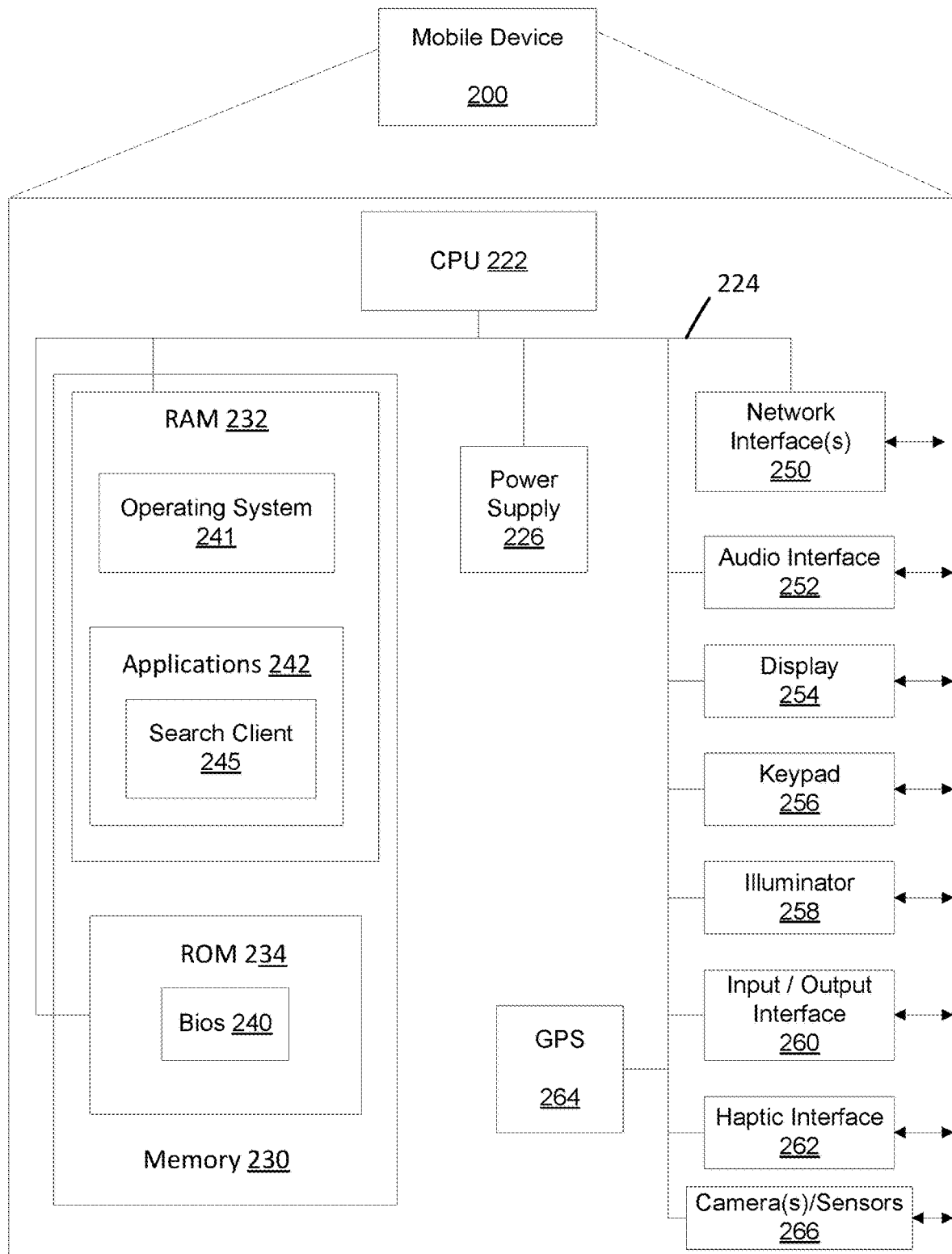
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geopositioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
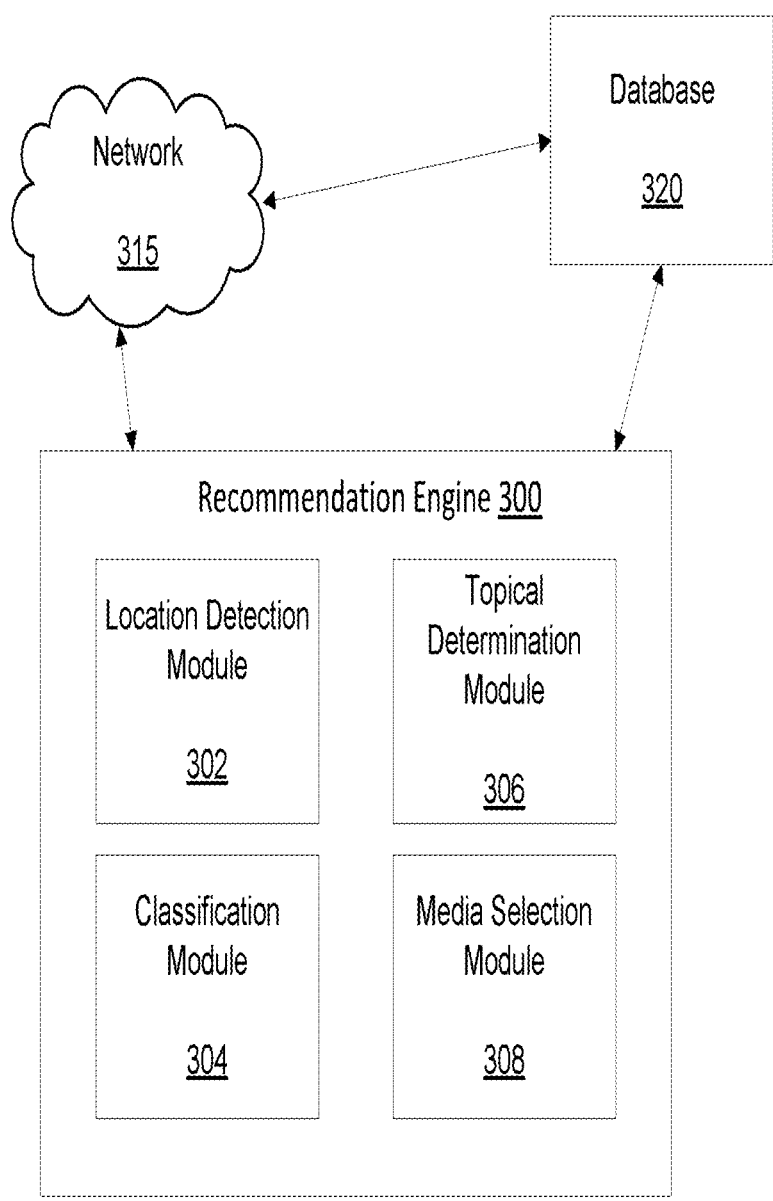
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a recommendation engine 300, network 315 and database 320. The recommendation engine 300 can be a special purpose machine or processor and could be hosted by an application server, content server, social networking server, web server, search server, content provider, email service provider, ad server, user's computing device, and the like, or any combination thereof.

According to some embodiments, recommendation engine 300 can be embodied as a stand-alone application that executes on a user device. In some embodiments, the recommendation engine 300 can function as an application installed on the user's device, and in some embodiments, such application can be a web-based application accessed by the user device over a network. In some embodiments, the recommendation engine 300 can be installed as an augmenting script, program or application to another media application (e.g., Flickr®, Tumblr®, Twitter®, Instagram®, SnapChat®, Facebook®, and the like).

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of data and metadata associated with local and/or network information related to users, services, applications, content (e.g., images) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information (i.e., past and present location(s) of the user, and future locations of the user (derived from a calendar or schedule of the user—e.g., planned activities), user biographic information, and the like, or some combination thereof. In some embodiments, the user data can also include, for purposes rendering and/or displaying images, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, photo hosting sites or providers that enable users to upload, download, share, edit, comment or otherwise avail users to media content (e.g., Flickr®, Tumblr®, Twitter®, Instagram®, SnapChat®, Facebook®, and the like). In some embodiments, database 320 can comprise data and metadata associated with image content from one and/or an assortment of media hosting sites. For example, the information can be related to, but not limited to, the user(s) that created or uploaded the image, the number of the user's that have shared the content, the identity of the user's that have shared an image, the location of the user(s) that uploaded and/or shared the image, the category of the image, the content type of the image, and the like. The information associated with stored images can also include, but is not limited to, timestamps indicating when the images where created, uploaded and/or shared, user generated descriptions of an image, tags associated with an image (e.g., tags describing an image and/or identified users, objects or locations/landmarks within an image) and/or geo-location information associated with the content of the image (e.g., a picture of the Grand Canyon has information indicating that the image comprises content associated with the Grand Canyon).

In some embodiments, the information stored in database 320 can be represented as an n-dimensional vector (or feature vector) for each image, where the information associated with the image corresponds to a node(s) on the vector. Additionally, the image information in database 320 for each image can comprise, but is not limited to, social metrics of the image (e.g., popularity of the image—a number of views, shares, favorites of the image), a title or comment(s) associated with the image, tags, descriptions, quality of the image, recency of the image's upload and/or share(s), and the like. Such factors can be derived from information provided by the user, a service provider (e.g., Yahoo! ®), by the content/service providers providing image content (e.g., Tumblr®, Flickr®), or by other third party services (e.g., Twitter®, Facebook®, Instagram®, and the like), or some combination thereof. In some embodiments, such additional factors can also be translated as nodes on the n-dimensional vector for a respective image.

As such, database 320 can store and index image information in database 320 as linked set of image data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion herein will focus on vector analysis of image information, as discussed above, the image information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

Database 320 can be a single database housing information associated with such providers, and in some embodiments, database 320 can be configured as a linked set of data stores that provides such information, as each datastore in the set is associated with and/or unique to a specific service provider. According to some embodiments, database 320 can be any known or to be known database associated with a photo-sharing or social networking site. By way of a non-limiting example, database 320 can comprise the YFCC100M image dataset which consists of 100 Million publicly-available Creative Commons Images™ from Flickr®.

According to some embodiments, as discussed in more detail below, only the photographs that have more than a predetermined number of views, shares and/or favorites are available for recommendation to a new user. For example, only those photos that have more than 10 views and/or 10 favorites are eligible for communication to a user. Such thresholds are applied for purposes of providing a new user only images that are of "high-quality"—those images that are of a minimum resolution, currently trending, and/or have potential for serving as the basis social engagement with other users.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the recommendation engine 300, and the database of stored resources 320. Indeed, as illustrated in FIG. 3, the recommendation engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as recommendation engine 300, and includes location detection module 302, classification module 304, topical determination module 306 and media selection module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

Figure 4:
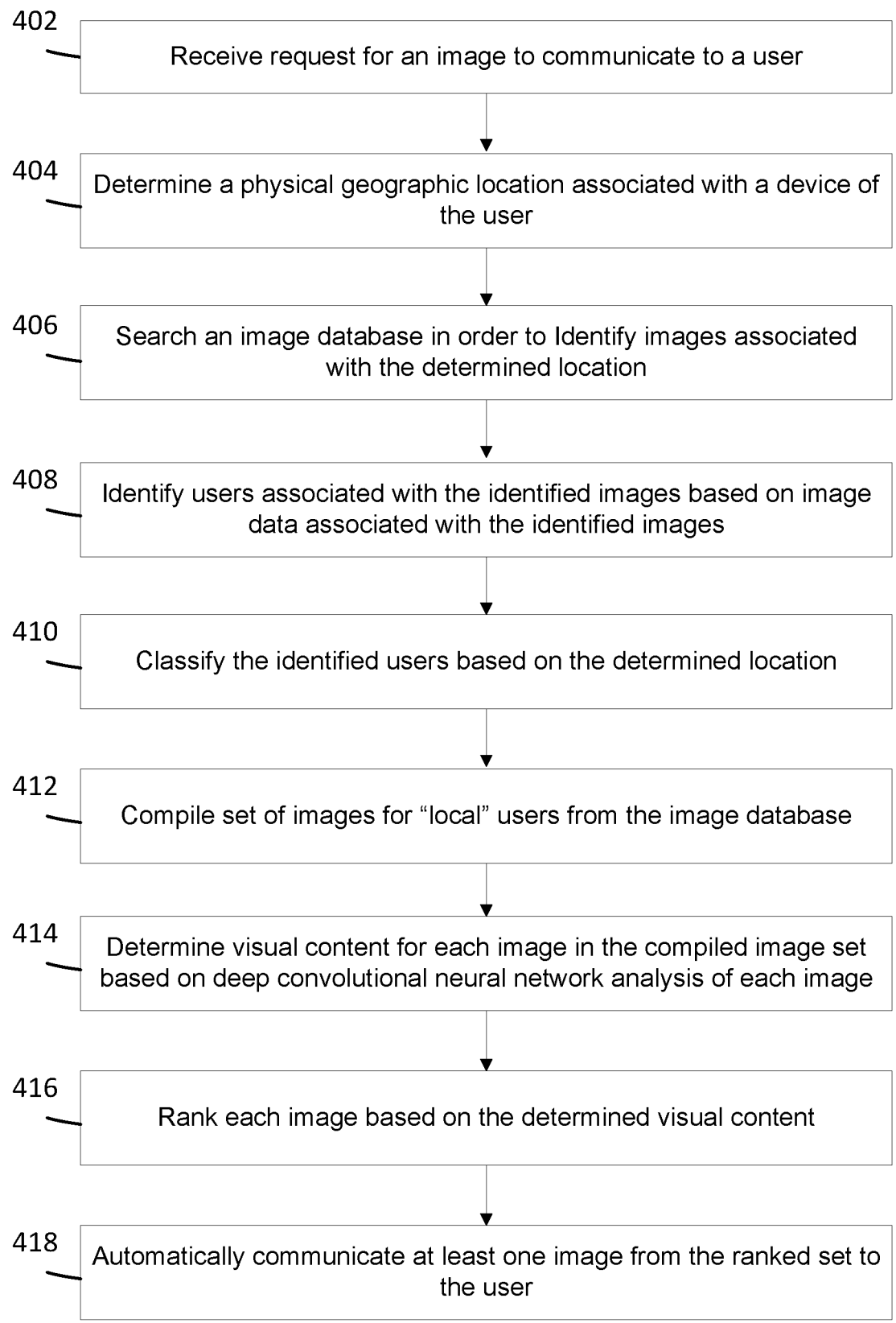
FIG. 4 is a flowchart illustrating steps performed in accordance with some embodiments of the present disclosure.

Turning to FIG. 4, Process 400 details steps performed in accordance with exemplary embodiments of the present disclosure for automatically recommending image content to a user based on the user's physical location.

Process 400 begins with Step 402 where a request for an image is received. In some embodiments, the request for an image may be based on specific request from a user. In some embodiments, the request in Step 402 may be automatically determined based on a user joining a network—where such joining can include, but is not limited to, signing up for a photo-sharing service, such as Flickr® or Tumblr®, downloading and/or opening a photo-sharing application for the first time, and/or logging into the photo-sharing service for the first time. It should be understood that any type of activity by a user, whether joining a photo-sharing social networking site, or following another user on such site, any type of activity can trigger a request for an image in accordance with Step 402.

Step 404 involves determining the location of the user. Step 404 is performed by the location detection module 302 of the recommendation engine 300. In some embodiments, the determination of the user's location can be triggered from a specific request received from a user or from a request associated with the user, as discussed above in relation to Step 402. For example, upon a user joining Tumblr®, a request can be communicated to the Tumblr® server for an image, where the request is understood to be for an image associated with the user's location. As such, Step 404 is to be performed.

In some embodiments, the location of the user can be determined based on GPS data associated with the user's device. In some embodiments, the location of the user can be based on the Internet Protocol (IP) address of the user's device. In some embodiments, as discussed above, the location of the user can be determined from the user's latitude and longitude coordinates, which in some embodiments, can be identified during the offline batch process discussed above. In some embodiments, the location of the user can be based on his/her user profile information. In some embodiments, the location of the user can be based on a recent post or comment by the user—for example, user Bob just "checked-in" on Facebook® at the Eifel Tower, therefore he can be determined to be in Paris, France.

In some embodiments, the location information of the user's device can be communicated along with the request for an image(s). Therefore, in such embodiments, Step 404 can involve the location detection module 302 parsing the request to identify the location information comprised within or accompanying the request. In some embodiments, the location detection module 302, in response to receiving the request from Step 402, can ping or communicate a signal to the requesting user device to obtain location information about the device. In response to the ping, or based on the ping/signal, the device's location information, which can include, but is not limited to, GPS data, IP address and/or latitude and longitude coordinates, can be obtained by module 302.

In some embodiments, Step 402 and 404 may be performed in reverse order. That is, a user's location may be determined, and then a request for content about that location can be received and/or automatically generated based on such location. In either embodiment, however, a user's location forms part of Process 400. The location information of the user (e.g., the location of the user's device) is determined (Step 404), which is utilized to identify and classify other users, as well as identify content from such users to provide to the requesting user, as discussed herein.

Process 400 then proceeds to Step 406 which is performed by the location detection module 302. In Step 406, images are identified that correspond to the determined location. Step 406 involves searching database 320 for images that are associated with the determined location. In some embodiments, such images can be images that depict the determined location. In some embodiments, such images can be images that have activity associated with the location, where such activity can include, but is not limited to, the creation or capture of an image, uploading and/or downloading an image, editing an image, sharing an image, commenting on an image, favoriting or "liking" an image, and the like.

In some embodiments, Step 406 involves translating the information associated with the location into an n-dimensional vector. For example, the location information can include the GPS coordinates associated with a specific location, and such coordinates correspond to nodes on the vector. The n-dimensional vector (also referred to as a feature vector) for the location is then utilized as a basis for searching an image repository—database 320. As discussed above, according to some embodiments, the images stored in the repository are stored and indexed as n-dimensional vectors. As such, Step 406 involves searching the database 320 by performing a computerized comparison between the feature vector of the determined location and the n-dimensional vectors of the images in database 320. Such comparison can be performed by any known or to be known vector space analysis and comparison technique, as those images having n-dimensional vectors matching the feature vector of the location at or above a similarity threshold are identified.

It should be understood that while the discussion above discusses vector analysis and comparison via n-dimensional vectors and/or feature vectors, any other known or to be known computational analysis and/or comparison technique or algorithm can be utilized without departing from the scope of the instant disclosure, such as, but not limited to, cluster analysis, data mining, Bayesian network analysis, Hidden Markov models, artificial neural network analysis, logical model and/or tree analysis, and the like.

In some embodiments, the images that correspond to the determined location can be searched for and identified based on tags associated with the stored images. Such tags can take the form of metadata or annotations to the images. These tags can provide information indicating the location of the image, the location where the activity associated with the image occurred and/or when such activity occurred. Thus, in some embodiments, a search of database 320 can be performed for images having associated therewith information corresponding to the determined location. In some embodiments, such search can involve parsing the metadata of each image in database 320 in order to identify the location identifying information of each image. In some embodiments, such search can involve vector analysis as discussed above, as the tags/metadata of each image is translated as a node(s) for each image's vector.

Thus, Step 406 involves identifying images that are associated with the determined location. The comparison of the location information associated with images and the determined location information can be subject to a similarity threshold, as discussed above. This similarity threshold is related to a proximity around the determined location (or within a predetermined radius to the determine location), such that only images that have location information directly related to the determined location are identified. In some embodiments, the similarity threshold can be set by a user, the system, the site/platform/service, and the like, or some combination thereof.

For example, if a user is at Mount Rushmore, the similarity threshold may be set at a wide proximity—e.g., 20 miles, as the locations of interest (or other landmarks) around Mount Rushmore may be limited (or located at a further distance away). In another example, if a user is in Time Square, the similarity threshold may only be a few feet, as the attractions within and around Times Square are plentiful.

As discussed above, only images that have at least a predetermined amount of activity will be identified in Step 406. For example, according to some embodiments, only images that have at least 10 views and/or 10 likes can be identified, while those images failing to satisfy the predetermined amount of activity may be discarded after being identified. In some embodiments, only those images satisfying the predetermine amount of activity will be eligible for discovery. Thus, Step 406 can include, in some embodiments, determining whether the identified images have associated therewith a predetermined amount of activity, where as discussed above, such activity can be based on the number of views, shares, likes, reblogs, comments, favorites, and the like, or some combination thereof.

In Step 408, which is performed by the classification module 304, the users associated with the identified images from Step 406 are identified. Step 408's identification of the user's that are associated with the images involves identifying the user's that have performed a type of activity in relation to the identified images. In exemplary embodiments, such activity can include only those users that have created, captured and/or uploaded such images. In some embodiments, the activity of such users may include, either additionally or alternatively, those users that have most recently interacted with the images—for example, the last user to share, reblog or favorite the image. In a similar manner as discussed above in relation to Step 406, identification of the users associated with the images can involve either vector analysis, and the like, or parsing the image data and metadata to determine the user's identity.

By way of a non-limiting example of Steps 402-408, user Bob joins and logs into the Tumblr® photo-sharing service and is determined to be located in New York, N.Y. (Steps 402-404). The recommendation engine 300 then identifies images within database 320 that are associated with New York City (Step 406). The recommendation engine 300 then identifies those users that have uploaded those identified images (Step 408).

Continuing with Process 400, Step 410 then proceeds to classify the identified users based on the determined location. Step 410 is performed by the classification module 304. According to some embodiments, Step 410's classification involves classifying the identified users as a "local" or a "tourist," as discussed above. While the disclosure herein will focus on two designations for users, it should not be construed as limiting, as any number or type of classification or designation can be applied to a user without departing from the scope of the instant disclosure.

According to some embodiments, Step 410's classification of a user as a local or tourist can be based on the photos that each user has uploaded over a period of time. That is, for each location, if a user has uploaded a predetermined number of photos (or threshold number of photos) during a predetermined period of time in/at that location, then the classification module 304 can classify the user as a "local." Step 410, therefore involves determining the how often, how long and/or the frequency a user posts photos to a media platform during a particular time period and comparing such information to a threshold to determine the user's classification. For example, if user Jane, visiting Los Angeles, Calif., has uploaded 75 photos over the past 2 weeks of Los Angeles, and the predetermined number of photos is set at 50 and the time period is set at 4 weeks, Jane would categorized as a "tourist" because she has not been at the location long enough. However, if Jane were living at the location for 12 weeks, and uploaded only 50 pictures, she would then be classified as a "local."

According to some embodiments, the determination of how long a user has been at a location can be based on the timestamps of their uploaded photos. When a user uploads a photograph, the uploaded photo has at least a timestamp indicating when the photo was captured/created and/or uploaded. When the difference between the timestamps of an initially uploaded photo and the most recently uploaded photo is at or above a time threshold, then the user would be determined to have been at the location for at least the predetermined period of time and can be classified as a "local."

In some embodiments, a user can be classified based on his/her profile information, browsing session information, or frequent check-in locations, and the like. For example, if a user's profile designates his/her location (e.g., residence) at or around the determined location (within the distance threshold as discussed above), then that user can be classified as a "local"; and if not, then they are classified as a "tourist."

In some embodiments, a user can be determined to be a "local" for many locations. For example, user Jane can be classified as a "local" for each of the following because she uploads a predetermined number of photos when at each location during a predetermined time period: the city where she spent her childhood, a city where she attended college, and a city where she is currently living. Similarly, a user can be a tourist in more than one location; however, a user cannot be both a local and a tourist for the same location.

Thus, based on the result of Steps 408 and 410, a set of images that are associated with the "local" users is compiled. Step 412, which is performed by the classification module 304. Specifically, Step 412 involves searching for and identifying a set of images from database 320 that are associated with those users that are determined to be "locals." Step 412 results in a compiled set of images for "locals" only. In some embodiments, the number of images in the set may be capped based on the population of the location, and/or number of images associated with the location. In some embodiments, the set of images includes all the images identifiable from database 320. In some embodiments, the set of images includes only those images that satisfy a temporal threshold—for example, those images that have been taken by the "local" users within the past year, or past month, and the like.

In some embodiments, as discussed above, Steps 410-412 can be performed for those users identified as "tourists" and/or "locals and tourists". Thus, in a similar manner as discussed below, while the discussion below involves compiling a recommendation set of images for a user based on, inter alia, "local" user's images, in some embodiments, Process 400 can result in a recommendation image set being based on "tourist" user images; and in some embodiments, two image sets can be provided to a user for a given location: one set for "locals" and one set for "tourists."

In Step 414, the image set compiled in Step 412 is analyzed to determine the visual content of each image. Step 414 is performed by the topical determination module 306. According to some embodiments, the visual concepts of each "local" image can be determined using any known or to be known machine-learned classifier and/or deep learning architecture or algorithmic technique, such as, but not limited to, deep neural networks (DNNs), artificial neural networks (ANNs), convolutional neural networks (CNNs), and deep belief networks.

For example, in some embodiments, the visual concepts in the images are identified using a deep convolutional neural network, which learns discriminative image representations from large-scale collections of images (e.g., those images stored in database 320—for example, images already existing on ImageNet™, Getty Images™, Tumblr® or Flickr® and the like). The topical determination module 306 can implement any known or to be known image classification technique or model, such as, but not limited to a Caffe framework which is trained on the ImageNet dataset. Such classification technique can produce, for example, a 4096-dimensional feature representation of each image. Using a linear support vector machine, or the like, each image can be classified along a determined number of visual concepts—for example, 1700 different ImageNet concepts. As discussed above, these automatically-detected visual concepts can be referred to as "autotags", which are used for visual descriptions of the content of the photos of the image set from Step 412.

In order to determine representative descriptors from the autotags for a given location (e.g., the determined location from Step 404), Step 414 involves mining for tags that have the highest degree of similarity (at or above a threshold) with the location. In some embodiments, this involves comparing the tags of each image for a given location and identifying the descriptors of the tags that are unique to the location. In some embodiments, this can involve applying any known or to be known conditional entropy algorithm (or any known or to be known similar clustering algorithm) between two random variables of at least two images: for example T (tags) and L (locations), written as H(T|L) is defined to measure the conditional uncertainty of tag T given location L. According to some embodiments, H(T|L) is determined for each tag t∈T and l∈L respectively.

$$h(T = t \mid L = l) = p(t, l) * \log \frac{p(l)}{p(t, l)}. \qquad (1)$$

In equation (1), P(T=t) is the probability of occurrence of tag t in the dataset defined as the ratio of the number of photos with tag t to the total number of photos in the dataset. P(L=1) is the probability of how common the location l is in the dataset defined as the ratio of the number of photos taken at the location to the total number of photos. P(t, l) is the probability of tag t and location l co-occurring, and is defined as the ratio of the number of photos at location l with tag t. According to embodiments of the present disclosure, the summation of values for all individual tags t and locations l results in the overall conditional entropy H(T|L).

In some embodiments, a tag t, in the above formulation, given a location l will have a large conditional entropy value if it is not a unique tag to the location—i.e., highly uncertain for the location. For example, the tag "outdoor" is one of the most common visual descriptors for a photo and is applicable to the majority of photos. Because "outdoors" is a common tag, it fails to reveal anything unique about a given location. On the other hand, a tag like "latte" has very small conditional entropy given the location. For example, this tag is very significant in characterizing the city of Seattle as it is captured implicitly in many photos taken at Starbucks® first cafe in the Pike Place market—a very famous tourist location overlooking the waterfront.

By way of a non-limiting example, the Table below illustrates the top 5 tags for Seattle and San Francisco, where each column is sorted by increasing entropy; this shows evidence of differences between the implicit content captured by locals and by tourists.

| San Francisco | | Seattle | |
| --- | --- | --- | --- |
| Locals | Tourists | Locals | Tourists |
| texture | urban | ocean | cafe |
| graffiti | architecture | sunset | latte |
| people | skyline | sidewalk | architecture |
| monochrome | ferrybuilding | urban decay | skyline |
| portrait | bridge | biking | outdoor |

For example, the top tags in Seattle for locals are: "ocean", "sidewalk" or "sunset" compared to those of tourists': "cafe", "urban" and "architecture". For example, photos from the locals often include the sunrise or sunset with activities such as walking, jogging or even casual photography along with the beautiful scenic waterfronts of Puget Sound or Lake Washington. Tourists, on the other hand, often capture the popular tourist destinations of Seattle such as the Starbucks® first cafe, Pike Place market, or the architecture and urbanity of the Space Needle and downtown.

In the case of San Francisco, for example, locals' photos consist of faces taken at local events or parades, or the graffiti taken in Clarion Alley (a popular area known for street art). Tourist photos, on the other hand, can include urban settings and other architecture influenced photos such as that of the skyline of the city including the famous Golden Gate and Bay bridges. The photos also often include pictures taken from Pier 39 and the ferry building. These examples provide evidence of the difference in the preferences that local users vs. tourist users capture in their images of a city.

Thus, as a result of Step 414, using the applied deep convolution neural network, as an example as discussed above, the visual concepts of each image in the compiled image set of Step 414 are determined. In Step 416, each image in the "local" image set is then ranked. The ranking is based on scores which are determined based on the visual concepts of each image (from Step 414) and the social activity of each image. According to some embodiments, a characteristic score ("charScore$_p$") for each photo in the "local" image set is determined:

$$char \mid Score_p = \frac{\#faves_p}{\sum_{i=1}^{n} \frac{h(t_i \in tags_p \mid l)}{n}}. \qquad (2)$$

"CharScore$_p$" represents the ratio of the number of favorites of a photo to the visual concepts of the photo—the mean conditional entropy value of all tags or concepts that describe the content of the photo. In equation (2), tags$_p$ are the tags applied to the photo p taken at location l. The concepts with lower entropy values imply that the concept is more unique to the location and therefore more likely to capture the characteristics of the location. A photo with low mean conditional entropy compared to a photo with a similar number of favorites but high entropy due to very generic concepts is likely to be more characteristic of the location.

Thus, based on the above formulations, Step 416 results in each of the images in the "local" image set being ranked according to the score of each image, where the image with the highest score is ranked the highest on the list and the images with lower scores are ordered in decreasing order. In Step 418, at least one image from the ranked "local" set is automatically communicated to the user. In some embodiments, only the highest ranked (or scored) image is communicated to the user. In some embodiments, a predetermined number of photos from the ranked "local" image set are provided to the user. In some embodiments, only the images satisfying a predetermined score threshold are provided to a user; and in some embodiments, the number of photos provided to a user is in accordance with a predetermined number of photos (e.g., the top 20 photos).

In some embodiments, the communication occurring in Step 418 can involve sending the recommended image(s) to the user by providing the image to the user via an application associated with the photo-sharing service the user is using (or just signed up for). For example, if the user is using a Tumblr® application on his/her smart phone, then a recommended image can be automatically reblogged on the user's Tumblr® page. In other embodiments, as understood by those of skill in the art, the recommended image(s) can be provided to the user in any other known or to be known manner, such as, but not limited to, via SMS, MMS, email or any known or to be known social networking platform (e.g., tweeting a link of the recommended photo's Tumblr® page to the user).

According to some embodiments of the present disclosure, information associated with a user's location, an image recommendation, visual topics of a recommended image, a selection or request by a user, and the like, as discussed above in relation to Process 400, can be fed back to the recommendation engine 300 for modeling (or training) of the information stored in database 320 via iterative or recursive bootstrapping or aggregation functionality. This can improve the accuracy of the identification of media recommendations presented to a specific user at a particular location. Embodiments of the present disclosure involve the recommendation engine 300 applying such recursive/bootstrapping functions utilizing any known or to be known open source and/or commercial software machine learning algorithm, technique or technology.

FIG. 5 is a work flow example 500 for serving relevant digital content associated with advertisements (e.g., advertisement content) based on the information associated with the media recommendation, as discussed above in relation to FIGS. 3-4. Such information, referred to as "recommendation information" for reference purposes only, can include, but is not limited to, the location of a user, the identity, context and/or type of media content being rendered and/or recommended, the content of such media, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 500 includes a user being recommended a photograph of a hiker wearing an REI® jacket hiking the Grand Canyon (because the user was determined to be at the Grand Canyon the locals who live near the Grand Canyon wear REI jackets when they hike or camp in the Grand Canyon). Based on such information, the user may be provided with digital ad content related to special promotions provided by REI®, or a promotional day-pass for admittance into the Grand Canyon.

In Step 502, recommendation information associated with the media recommendation is identified. As discussed above, the recommendation information can be based on the recommendation process outlined above with respect to FIGS. 3-4. For purposes of this disclosure, Process 500 will refer to single media recommendation as the basis for serving an advertisement(s); however, it should not be construed as limiting, as any number of recommendations, and/or quantities of information related to applications on a user device and/or media renderable via such applications can form such basis, without departing from the scope of the instant disclosure.

In Step 504, a context is determined based on the identified recommendation information. This context forms a basis for serving advertisements related to the recommendation information. In some embodiments, the context can be determined by determining a category which the recommendation information of Step 502 represents. For example, the category can be related to the determined location of a user, as discussed above, or can be related to the content type of the media being recommended, selected or rendered. In some embodiments, the identification of the context from Step 504 can occur before, during and/or after the analysis detailed above with respect to Process 400, or some combination thereof.

In Step 506, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 508, the advertisement server 130 searches the ad database for an advertisement(s) that matches the identified context. In Step 510, an advertisement is selected (or retrieved) based on the results of Step 508. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to render the media (e.g., Tumblr® or Flickr® application upon which the user is viewing a recommended photo). Step 512. In some embodiments, the selected advertisement is sent directly to each user's computing device. In some embodiments, the selected advertisement is displayed in conjunction with the rendered and/or recommended media on the user's device and/or within the application being used to recommend and/or render the media.

As shown in FIG. 6, internal architecture 600 of a computing device(s), computing system, computing platform and the like includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk interface 608 and/or media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces 622 not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing image and/or video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving, at a computing device over a network, a request for a media file from a device of a user, said request comprising global positioning (GPS) data associated with the device at the time the request is communicated from the device to the computing device;
    determining, via the computing device, using the GPS data, a geographic location associated with the device;
    accessing, via the computing device, a collection of media files associated with a media platform;

parsing, via the computing device, each media file to identify metadata associated with each media file;

analyzing, via the computing device, using the determined geographic location, the identified metadata of each media file to identify a first media file from the collection that is associated with said geographic location;

analyzing, via the computing device, the first media file to identify a first user that uploaded the first media file to the media file platform, said first user being different than the user from which the request was received;

searching the collection via the computing device, using an identity of the first user, to identify a set of media files within the collection that is associated with the first user;

analyzing, via the computing device, each media file within said set of media files to determine an activity associated with the first user that resulted in the respective media file being uploaded to said media platform;

analyzing, via the computing device, said activity performed by the first user that resulted in the set of media files being uploaded, said analysis comprising identifying characteristics associated with each upload of each media file;

determining, via the computing device, a classification of the first user based on the upload characteristics of said determined activity, said classification indicating a relationship between the first user and the geographic location;

determining, via the computing device, a subset of media files to be communicated to the user based on said classification of the first user, a number of the media files in the subset and a ranking of each media file in the subset being based on said relationship; and automatically communicating, via the computing device, said subset of media files of the first user to the user device in response to said request.

2. The method of claim 1, further comprising:
further analyzing each media file in said set of media files of the first user, and determining, based on said analysis, visual content information and social metric information for each media file in the set;

determining a score for each media file in the set based on the determined visual content information and social metric information of the respective media file; and ranking, via the computing device, each media file in the set based on the determined score, wherein the media files in the set with higher scores are ranked higher than those with lower scores, wherein said subset is based on said ranking.

3. The method of claim 2, wherein said determination of said visual content information for each media file is based on determined feature representations of each media file from a deep convolutional neural network.

4. The method of claim 2, wherein said social metrics for each media file comprise information indicating overall activity for the media file on the media platform, said information comprising data selected from a group consisting of: a number of user views, a number of user shares, a number of user likes, a number of user favorites and a number of user reblogs.

5. The method of claim 1, further comprising:
analyzing said media files associated with the first user, and based on said analysis, identifying a second subset of media files that are user-generated by the first user, wherein said subset of media files only comprises user-generated media files.

6. The method of claim 1, further comprising:
weighting, based on said classification of the first user, each media file in said subset; and ranking said subset based on said weighting, wherein said subset is based on said ranking.

7. The method of claim 1, wherein said communication occurs only when said first user is classified as a local.

8. The method of claim 1, further comprising:
determining that said user is a new user to the media platform, wherein said request for the media file is based on said new user determination, and wherein said communication comprises posting the at least one ranked media file to a page on the media platform associated with the user.

9. The method of claim 1, wherein said identifying the first user is further based on the first media file having information associated therewith indicating when the first user performed an action selected from a group consisting of: creating or capturing the media file, commenting on the media file, sharing the media file on the media platform, favoriting the media file, and editing the media file.

10. A non-transitory computer-readable storage medium tangibly encoded with computer-executable instructions, that when executed by a processor associated with a computing device, performs a method comprising:

receiving, at the computing device over a network, a request for a media file from a device of a user, said request comprising global positioning (GPS) data associated with the device at the time the request is communicated from the device to the computing device;

determining, via the computing device, using the GPS data, a geographic location associated with the device;

accessing, via the computing device, a collection of media files associated with a media platform;

parsing, via the computing device, each media file to identify metadata associated with each media file;

analyzing, via the computing device, using the determined geographic location, the identified metadata of each media file to identify a first media file from the collection that is associated with said geographic location;

analyzing, via the computing device, the first media file to identify a first user that uploaded the first media file to the media file platform, said first user being different than the user from which the request was received;

searching the collection via the computing device, using an identity of the first user, to identify a set of media files within the collection that is associated with the first user;

analyzing, via the computing device, each media file within said set of media files to determine an activity associated with the first user that resulted in the respective media file being uploaded to said media platform;

analyzing, via the computing device, said activity performed by the first user that resulted in the set of media files being uploaded, said analysis comprising identifying characteristics associated with each upload of each media file;

determining, via the computing device, a classification of the first user based on the upload characteristics of said determined activity, said classification indicating a relationship between the first user and the geographic location;

determining, via the computing device, a subset of media files to be communicated to the user based on said classification of the first user, a number of the media files in the subset and a ranking of each media file in the subset being based on said relationship; and automatically communicating, via the computing device, said subset of media files of the first user to the user device in response to said request.

11. The non-transitory computer-readable storage medium of claim 10, further comprising:
further analyzing each media file in said set of media files of the first user, and determining, based on said analysis, visual content information and social metric information for each media file in the set;
determining a score for each media file in the set based on the determined visual content information and social metric information of the respective media file; and
ranking, via the computing device, each media file in the set based on the determined score, wherein the media files in the set with higher scores are ranked higher than those with lower scores, wherein said subset is based on said ranking.

12. The non-transitory computer-readable storage medium of claim 11, wherein said determination of said visual content information for each media file is based on determined feature representations of each media file from a deep convolutional neural network.

13. The non-transitory computer-readable storage medium of claim 11, wherein said social metrics for each media file comprise information indicating overall activity for the media file on the media platform, said information comprising data selected from a group consisting of: a number of user views, a number of user shares, a number of user likes, a number of user favorites and a number of user reblogs.

14. The non-transitory computer-readable storage medium of claim 10, further comprising:
analyzing said media files associated with the first user, and based on said analysis, identifying a second subset of media files that are user-generated by the first user, wherein said subset of media files only comprises user-generated media files.

15. The non-transitory computer-readable storage medium of claim 10, further comprising:
weighting, based on said classification of the first user, each media file in said subset; and
ranking said subset based on said weighting, wherein said subset is based on said ranking.

16. The non-transitory computer-readable storage medium of claim 10, wherein said communication occurs only when said first user is classified as a local.

17. The non-transitory computer-readable storage medium of claim 10, further comprising:
determining that said user is a new user to the media platform, wherein said request for the media file is based on said new user determination, and wherein said communication comprises posting the at least one ranked media file to a page on the media platform associated with the user.

18. The non-transitory computer-readable storage medium of claim 10, wherein said identifying the first user is further based on the first media file having information associated therewith indicating when the first user performed an action selected from a group consisting of: creating or capturing the media file, commenting on the media file, sharing the media file on the media platform, favoriting the media file, and editing the media file.

19. A computing device comprising:
a processor; and
a non-transitory computer-readable storage medium for tangibly storing thereon program logic for execution by the processor, the program logic comprising:

logic executed by the processor for receiving, at the computing device over a network, a request for a media file from a device of a user, said request comprising global positioning (GPS) data associated with the device at the time the request is communicated from the device to the computing device;
logic executed by the processor for determining, via the computing device, using the GPS data, a geographic location associated with the device;
logic executed by the processor for accessing, via the computing device, a collection of media files associated with a media platform;
logic executed by the processor for parsing, via the computing device, each media file to identify metadata associated with each media file;
logic executed by the processor for analyzing, via the computing device, using the determined geographic location, the identified metadata of each media file to identify a first media file from the collection that is associated with said geographic location;
logic executed by the processor for analyzing, via the computing device, the first media file to identify a first user that uploaded the first media file to the media file platform, said first user being different than the user from which the request was received;
logic executed by the processor for searching the collection via the computing device, using an identity of the first user, to identify a set of media files within the collection that is associated with the first user;
logic executed by the processor for analyzing, via the computing device, each media file within said set of media files to determine an activity associated with the first user that resulted in the respective media file being uploaded to said media platform;
logic executed by the processor for analyzing, via the computing device, said activity performed by the first user that resulted in the set of media files being uploaded, said analysis comprising identifying characteristics associated with each upload of each media file;
logic executed by the processor for determining, via the computing device, a classification of the first user based on the upload characteristics of said determined activity, said classification indicating a relationship between the first user and the geographic location;
logic executed by the processor for determining, via the computing device, a subset of media files to be communicated to the user based on said classification of the first user, a number of the media files in the subset and a ranking of each media file in the subset being based on said relationship; and
logic executed by the processor for automatically communicating, via the computing device, said subset of media files of the first user to the user device in response to said request.

20. The computing device of claim 19, further comprising:
logic executed by the processor for analyzing said media files associated with the first user, and based on said analysis, identifying a second subset of media files that are user-generated by the first user, wherein said subset of media files only comprises user-generated media files.

21. The method of claim 1, wherein said classification indicates that said user is a tourist to said geographic location.

22. The non-transitory computer-readable storage medium of claim 10, wherein said classification indicates that said user is a tourist to said geographic location.

23. The computing device of claim 19, wherein said classification indicates that said user is a tourist to said geographic location.

* * * * *